Feb. 19, 1946.  V. J. LAYMON  2,395,332
AUTOMATIC BELT TIGHTENER
Filed May 22, 1943  2 Sheets-Sheet 1
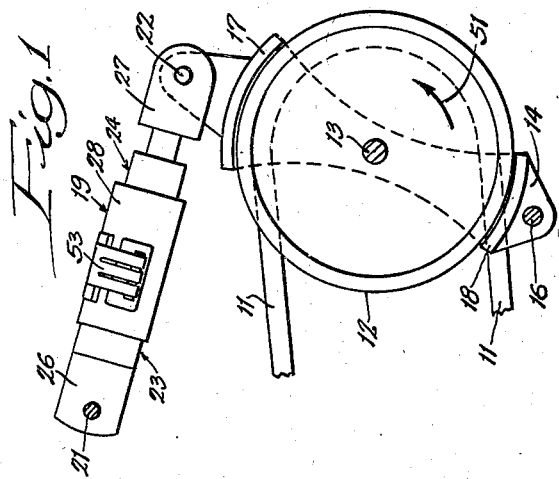
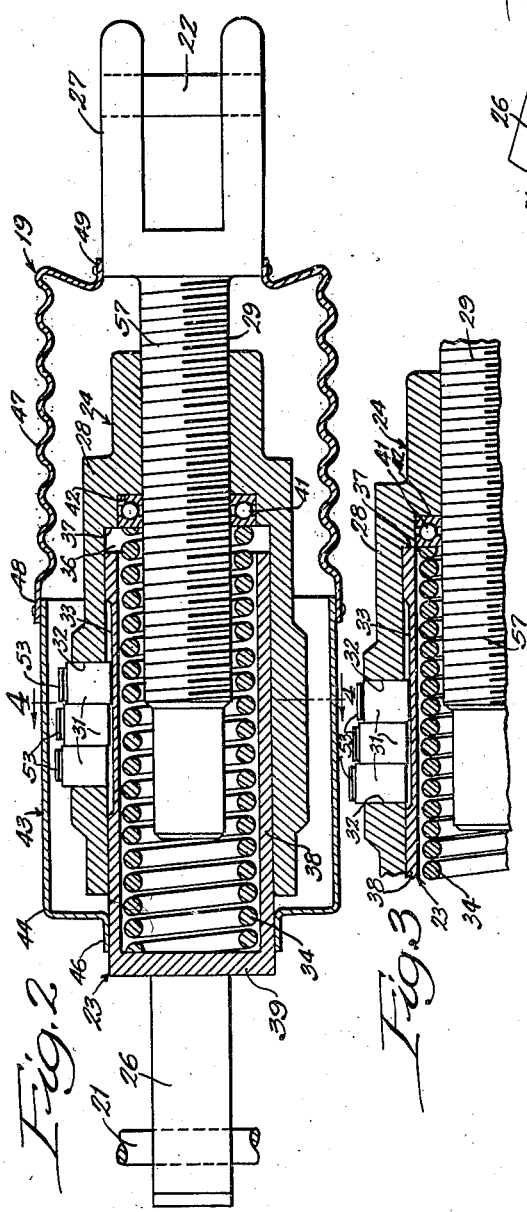
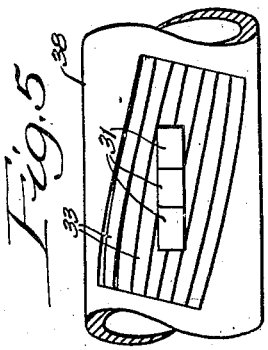
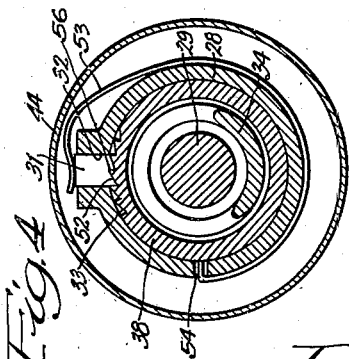
Inventor:
Vaughn J. Laymon,
By Paul O. Pippel
Attorney.

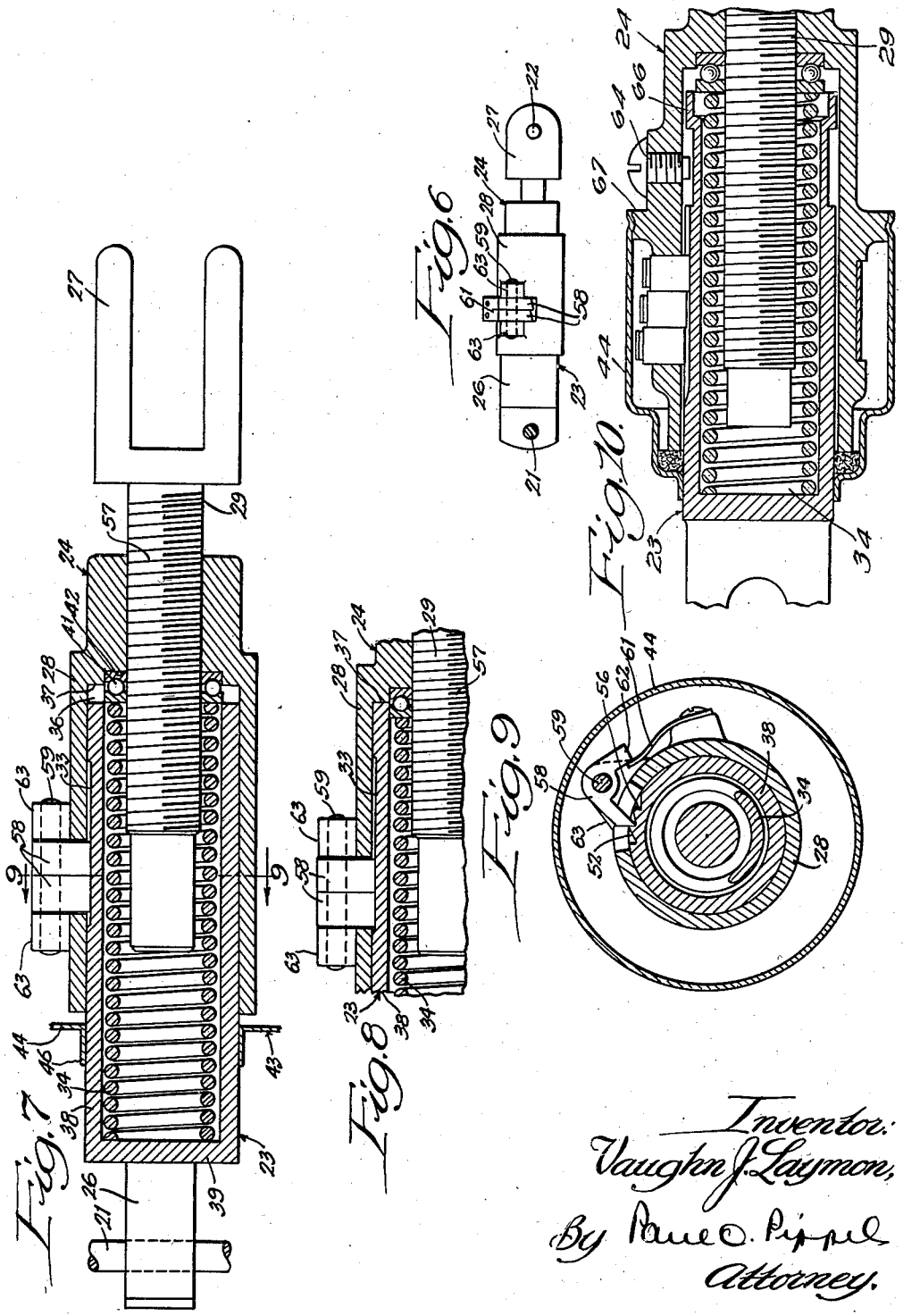

Patented Feb. 19, 1946

2,395,332

UNITED STATES PATENT OFFICE 2,395,332

AUTOMATIC BELT TIGHTENER

Vaughn J. Laymon, Fort Wayne, Ind., assignor to International Harvester Company, a corporation of New Jersey Application May 22, 1943, Serial No. 488,057

12 Claims. (Cl. 74—242.11)

This invention relates to a new and improved automatic belt tightener and has for one of its principal objects the provision of means for taking up belt slack due to wear, tear, and stretch caused by ordinary service.

Heretofore, endless driving means such as belts or chains have been equipped with means for manually permanently shortening the length thereof. This procedure caused loss of time in maintaining the belts at the proper tension, and inasmuch as such operation was manual, the belts were not always tightened when they should have been. Such failure to tighten the belts permitted slippage and thus excessive wear on the belts and oftentimes was the cause of some shop accident. Springs have been used to supply belt drives with resiliency, but it is not believed that automatic means have been employed to permanently take up belt slack.

It is the primary purpose of this invention, therefore, to eliminate all manual operation in accomplishing belt tightening.

Another important object of this invention is to hingedly mount a belt pulley and supply a means for automatically shifting the hinged pulley to constantly maintain proper belt tension.

Other and further important objects of this invention will become apparent from the disclosures in the following specification and accompanying drawings, in which:

Figure 1 shows a side elevation of a belt drive having the automatic tightener of this invention incorporated therein;

Figure 2 is a longitudinal sectional view of the tightener as shown in Figure 1;

Figure 3 is a portion of the tightener shown in Figure 2 in a shifted position;

Figure 4 is a sectional view taken on the line 4—4 of Figure 2;

Figure 5 is a detail plan view of a portion of the tightener shown in Figures 1 to 4, inclusive;

Figure 6 is a side elevation of a modified form of tightener;

Figure 7 is a longitudinal sectional view of the tightener as shown in Figure 6;

Figure 8 is a portion of the tightener shown in Figure 7 in a shifted position;

Figure 9 is a transverse sectional view taken on the line 9—9 of Figure 7; and

Figure 10 is a longitudinal sectional view of a further slightly modified form of the tightener.

As shown in the drawings, the reference numeral 11 indicates generally a belt adapted to drive machine elements and is shown mounted on a pulley or sheave 12, which is in turn mounted for rotation on its axis 13 supported approximately midway between the ends of a bracket or lever 14. The lower end of the bracket 14 is hingedly anchored at a pivot point 16. The bracket 14 includes projections 17 and 18 for holding the belt within the sheave 12. The upper end of the lever 14 is maintained in desired position by an automatic belt tightener 19 of this invention. The tightener 19 is hingedly anchored at 21 and pivotally engages the upper portion of the bracket 14 at an axis 22. The tightener 19 is supplied with expansible means operable automatically, depending upon the tension in the belt 11.

As best shown in Figure 2, the tightener 19 is equipped with inner and outer telescoped units 23 and 24. The inner unit 23 comprises an extension 26 capable of being pivotally attached to some fixed object around the axis 21. The outer telescoped unit 24 is similarly equipped with an extension 27 of the bifurcated type and adapted to engage the bracket or lever 14 around the axis 22. The outer unit 24 consists of an outer sleeve portion 28 and an inner threaded stud 29 engaging a threaded bore in the sleeve 28 and forming an integral part of the bifurcated portion 27. The sleeve portion 28 supports a plurality of pawls 31 and permits their actuation through correspondingly shaped apertures 32 in the sleeve 28. The inner telescoped unit 23 is equipped with angularly positioned ratchet teeth 33 on the outer surface thereof. These ratchet teeth 33 are on such an angle that they are adapted to individually and successively receive the pawls 31, and, upon compressing the inner telescoped unit 23 within the outer telescoped unit 24, the pawls travel in the angular ratchet teeth 33 and cause rotation of the sleeve 28 around the inner telescoped member 23 and with respect to the threaded stud 29 so that the outer telescoped unit 24 is now expanded the distance caused by the unscrewing action of the sleeve 28 on the stud 29. A spring 34, which may be any yieldable means, is positioned intermediate the inner and outer telescoped units 23 and 24 to normally maintain said units in separated position, as shown in Figure 2, wherein a space 36 is shown between a sleeve 38 of the inner telescoped unit 23 and an internal annular shoulder 37 of the sleeve 28 of the outer telescoped unit 24. The spring 34 abuts an end 39 of the unit 23 and at its other end engages a ball bearing 41, which superposes the threaded stud 29 and rests against a second offset annular shoulder 42 in the sleeve portion 28 of the outer unit 24. A housing 43 consists of a rigid portion 44 secured to the inner telescoped unit 23 at 46 and a bellows or the like 47 made of leather or other suitable material and affixed to the rigid portion at 48 and to the bifurcated extension 27 at 49.

In operation, the device is installed as shown in Figure 1, wherein it is capable of shifting the pulley center 13 through an arcuate range dependent upon the pivot point 16 of the bracket 14. The belt 11 is wrapped around two or more pulleys and initially manually adjusted to the right amount of tension to effect good driving. One of the pulleys around which the belt 11 is wrapped is mounted in a manner such as the pulley 12 shown in Figure 1, or mounted similarly, so that its axis may be movable. Assuming that the belt 11 is traveling in the direction shown by an arrow 51 in Figure 1, the belt, upon having its operation halted, tends to relax, and the spring 34 separates the telescoped units 23 and 24, so that there is a space 36 between these two units. Such operation of the units 23 and 24 does not cause the pawls 31 to rotate the sleeve 28 with respect to the threaded stud 29, but rather, the pawls, which are vertically reciprocable, are permitted to jump over the slightly inclined sides 52 of the teeth 33. As best shown in Figure 4, a spring 53 engages the tops of the pawls 31 and is held in engaging position by reason of its end being locked in an aperture 54 in the outer sleeve 28. When motion is again imparted to the belt 11, the outer telescoped unit 24 is forced inwardly onto the inner telescoped unit 23, so that the extension in the spring 34 is overcome, as shown in Figure 3. Such compression of the units 23 and 24 with respect to each other causes an angular or spiral motion of the pawls 31 in the ratchet teeth 33, inasmuch as, when the pawls 31 are traveling in this direction, they engage steep portions 56 of the teeth 33. Rotation of the sleeve 28 is then effected between the sleeve and the threaded stud 29, thereby causing the unit 24 to expand for the reason that the sleeve 28 automatically unscrews from the stud 29. It will be seen that, upon each starting and stopping operation of a loose belt 11, it will be tightened by the axis 13 of the pulley 12 moving further away from its cooperating pulley or pulleys. The wear of belts is reputedly greater when the belt is started or stopped, because friction at that time is greater than when the belt has gained running speed, and, for that reason, it is deemed desirable to provide an automatic belt tightener which causes tightening of the belt in small increments each time the belt is started. The amount of tightening depends upon several conditions, such as the initial tension of the belt, which controls the ultimate expansion of the telescoped units 23 and 24, as shown in the position of Figure 2. If the belt is relatively loose to begin with, the separation space 36 is greater when the belt has its operation halted. Such greater separation causes a correspondingly greater contraction and hence greater movement of the pawls 31 in the ratchet teeth 33 and, therefore, more rotation of the sleeve 28 on the threaded stud 29 for final greater expansion of the unit 24. Conversely, if the belt is initially tight or the tension proper, the separation of the units 23 and 24 will likewise be smaller and in some instances the separation will be nil, so that the unit 24, upon the belt being started, will expand very little or not at all. Other conditions which control the amount of belt tightening are the pitch of the threads 57 on the stud 29 and also the angular pitch of the ratchet teeth 33. It is obvious that, if the pitch of the threads 57 is relatively small, the expanding of the unit 24 will likewise be small, and, conversely, if the pitch is greater, the expansion of the unit 24 will be relatively larger. The angular pitch of the ratchet teeth 33 likewise is a controlling factor in the amount of rotational movement of the sleeve 28 with respect to the stud 29.

The device, as shown in Figures 6 to 9, inclusive, is similar in all respects to the form shown in Figures 1 to 5, inclusive, except for the modified form of pawl. The reference characters used in describing the belt tightener shown in Figures 1 to 5 will be used on all identical parts of Figures 7 to 9, inclusive. The distinguishing characteristics of the tightener shown in these Figures 7 to 9 are depicted by the showing in Figure 9, wherein a pawl 58, pivoted at 59 and having a leaf spring 61, engages the under side of an extension 62 of the pawl 58, so that the pawl 58 yieldably engages the ratchet teeth 33 with their respective slightly inclined sides 52 and their steep sides 56. As shown in Figure 7, the pawls are supported by a pair of lugs 63 extending upwardly from the sleeve 28, and through which the pivot shaft 59 is journaled.

Figure 8 is similar to Figure 3 in that it shows the telescoped units 23 and 24 in abutting relationship and the pawls 58 moved forwardly in the ratchet teeth 33.

It will be understood that numerous types of pawls could be employed, such as the modified form shown in Figures 6 to 9, and also that other details may be changed to accommodate other types of shifting pulleys. The housing 43 has been eliminated from Figures 1 and 6 in order that more of the operable elements show. This housing 43 is for the dual purpose of preventing dust and foreign matter from entering and, secondly, of preventing tampering with the automatic tightening of the expansion device.

Figure 10 is a slightly modified form of tightener, wherein a limit extension means is provided between the telescopic members 23 and 24. This means is in the form of a screw 64 which engages a threaded aperture in the outer telescopic member 24 and, upon a separation of the members, contacts the shoulder 66 provided on the internal telescopic member 23. The housing 43 shown in this modified tightener has also been changed in that the bellows has been eliminated, leaving only the rigid portion 44, which terminates in sealed relationship with a raised annular flange 67 on the outer telescopic member 24.

The foregoing detailed description has been given for clearness of understanding, and no limitation should be deduced therefrom except by the appended claims.

What is claimed is:

1. A belt tightener comprising inner and outer telescoped units, the inner of said units being hinged to an anchoring point, a lever having one end hinged at another anchoring point, the other end of said lever hingedly attached to the outer of said telescoped units, a sheave mounted for rotation intermediate the ends of said lever, yieldable means intermediate said telescoped units for normally separating said units, and the inner of said telescoped units having angular grooves in the surface thereof, the outer of said telescoped units having pawls engaging said grooves, and the outer of said units having means for separably expanding, said means for separably expanding comprising a pair of threaded members, springs tending to maintain engagement of said pawls in said grooves whereby upon compressing the telescoped units by overcoming the yieldable means the pawls travel in the angular grooves and thus cause the outer telescoped unit to expand by reason of the rotation of one of said threaded members with respect to the other of said threaded members.

2. A belt tightener comprising inner and outer telescoped units, the inner of said units being attached to an anchoring point, a movable sheave, the outer of said telescoped units attached to said movable sheave, yieldable means intermediate said telescoped units for normally separating said units, and the inner of said telescoped units having angular grooves in the surface thereof, the outer of said telescoped units having pawls engaging said grooves, and the outer of said units having means for separably expanding, said means for separably expanding comprising a pair of threaded members, springs tending to maintain engagement of said pawls in said grooves, whereby upon compressing the telescoped units by overcoming the yieldable means the pawls travel in the angular grooves and thus cause the outer telescoped unit to expand by reason of the rotation of one of said threaded members with respect to the other of said threaded members, and an outer expansible housing for said telescoped units.

3. An automatically expansible belt tightener comprising inner and outer telescope units, the outer of said units comprising a threaded stud and a sleeve having an internally threaded bore for receiving said stud, yieldable means positioned intermediate said telescoped units for normally tending to separate said units, and means for causing said sleeve to rotate on said threaded stud.

4. An automatically expansible belt tightener comprising inner and outer telescoped units, the outer of said units comprising a threaded stud and a sleeve having an internally threaded bore for receiving said stud, yieldable means positioned intermediate said telescoped units for normally tending to separate said units, and means for causing said sleeve to rotate on said threaded stud, said means comprising a pawl on said outer telescoped unit and a ratchet on said inner telescoped unit.

5. An automatically expansible belt tightener comprising inner and outer telescoped units, the outer of said units comprising a threaded stud and a sleeve having an internally threaded bore for receiving said stud, yieldable means positioned intermediate said telescoped units for normally tending to separate said units, and means for causing said sleeve to rotate on said threaded stud, said means comprising vertically slidable pawls on said outer telescoped unit and spiral ratchets on said inner telescoped unit, whereby said pawls engage said ratchets.

6. An automatically expansible belt tightener comprising inner and outer telescoped units, the outer of said units comprising a threaded stud and a sleeve having an internally threaded bore for receiving said stud, yieldable means positioned intermediate said telescoped units for normally tending to separate said units, limit extension means intermediate said telescoped units, means for causing said sleeve to rotate on said threaded stud, and said means comprising spring pressed, vertically slidable pawls on said outer telescoped unit and spiral ratchets on said inner telescoped unit, whereby said pawls engage said ratchets.

7. An automatically expansible belt tightener comprising inner and outer telescoped units, the outer of said units comprising a threaded stud and a sleeve having an internally threaded bore for receiving said stud, yieldable means positioned intermediate said telescoped units for normally tending to separate said units, and means for causing said sleeve to rotate on said threaded stud, said means comprising pivotable pawls on said outer telescoped unit and spiral ratchets on said inner telescoped unit, whereby said pawls engage said ratchets.

8. An automatically expansible belt tightener comprising inner and outer telescoped units, the outer of said units comprising a threaded stud and a sleeve having an internally threaded bore for receiving said stud, yieldable means positioned intermediate said telescoped units for normally tending to separate said units, and means for causing said sleeve to rotate on said threaded stud, said means comprising yieldably retained pivotable pawls on said outer telescoped unit and spiral ratchets on said inner telescoped unit, whereby said pawls engage said ratchets.

9. An automatically expansible belt tightener comprising inner and outer telescoped units, the outer of said units comprising a threaded stud and a sleeve having an internally threaded bore for receiving said stud, yieldable means positioned intermediate said telescoped units for normally tending to separate said units, and means for causing said sleeve to rotate on said threaded stud, said means comprising pawls operable through said outer telescoped unit, and spiral teeth on the surface of said inner telescoped unit, whereby said pawls travel on said teeth upon compressing said telescoped units and said pawls jump over said teeth upon an expanding of said telescoped units.

10. A belt tightener comprising a pair of slidably telescoped units, one of said units including at least two parts, means whereby one unit is extensible upon rotation of one part relative to the other, resilient means for normally tending to longitudinally separate said pair of units, and means operative upon longitudinal separation and contraction of the units for causing rotation of one part of the one unit, said last named means including a pawl and an inclined ratchet associated intermediate said units, whereby extension of the belt tightener is effected.

11. A belt tightener comprising a pair of slidably telescoped units, one of said units including at least two parts threadedly connected, said one unit being extensible upon rotation of one part relative to the other, spring means for normally tending to longitudinally separate said pair of units, and means operative upon longitudinal separation and contraction of the units for causing rotation of one of the threadedly connected parts of the one unit, for causing permanent extension of the pair of telescoped units.

12. A belt tightener comprising a pair of slidably telescoped units, one of said units including at least two parts threadedly connected, said one unit being extensible upon rotation of one part relative to the other, spring means for normally tending to longitudinally separate said pair of units, and automatic means operative upon longitudinal separation and contraction of the units for causing rotation of one part of the one unit, said automatic means including a pawl and an inclined ratchet associated intermediate said units, whereby permanent extension of the belt tightener is effected.

VAUGHN J. LAYMON.